Figure 1:
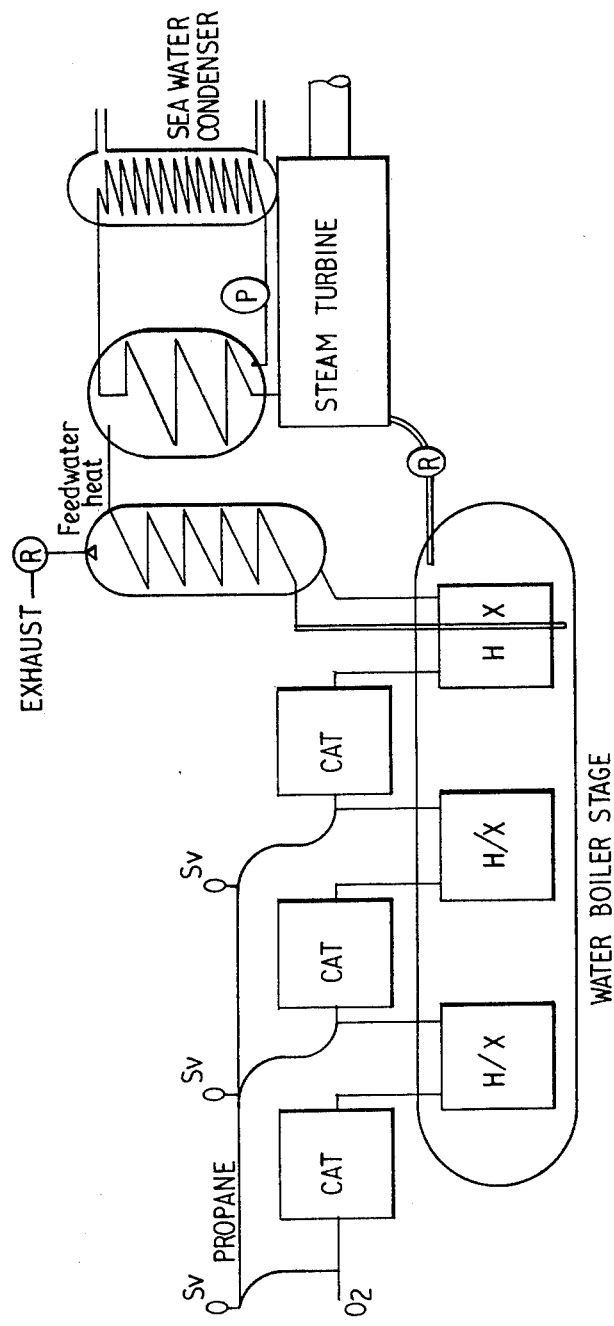

United States Patent [19]

Enga

[11] 4,254,739
[45] Mar. 10, 1981

[54] POWER SOURCES

[75] Inventor: Bernard E. Enga, Nystad, England

[73] Assignee: Johnson, Matthey & Co., Limited, London, England

[21] Appl. No.: 35,825

[22] Filed: May 4, 1979

[30] Foreign Application Priority Data

May 8, 1978 [GB] United Kingdom ............... 18239/78

[51] Int. Cl.³ ............................................... F22B 1/00
[52] U.S. Cl. .................................................. 122/4 D
[58] Field of Search ......................... 122/4 D; 431/268

[56] References Cited

U.S. PATENT DOCUMENTS

| | | | |
|---|---|---|---|
| 2,718,460 | 9/1955 | Bowen | 122/4 D |
| 2,934,551 | 4/1960 | Stringer | 122/4 D |
| 3,057,400 | 10/1962 | Wagner | 431/268 |
| 3,110,300 | 11/1963 | Brown et al. | 122/4 D |
| 3,245,459 | 4/1966 | Keith | 431/268 |
| 3,908,602 | 9/1975 | Brulfert et al. | 122/4 D |
| 3,955,556 | 5/1976 | Pangborn et al. | 122/4 D |

*Primary Examiner*—Anthony V. Ciarlante
*Attorney, Agent, or Firm*—Cushman, Darby & Cushman

[57] ABSTRACT

This invention relates to power sources which may be used underwater and to such sources in which catalytic combustion of the fuel takes place.

The power source according to the invention includes two or more catalytic combustors each comprising a fuel injector, a supported catalyst having a ceramic or metallic support, a high surface area refractory metal oxide coating on the support and a catalytic layer on the coating the catalytic layer comprising a platinum group metal selected from the group consisting of Ru, Rh, Pd, Ir, Pt alloys of the said metals with each other and alloys of one or more of the said metals with one or more base metals such that at least 10% by weight of the said catalyst is a platinum group metal each combustor having a separate fuel supply and a separate heat exchange unit which form part of the same boiler.

8 Claims, 2 Drawing Figures

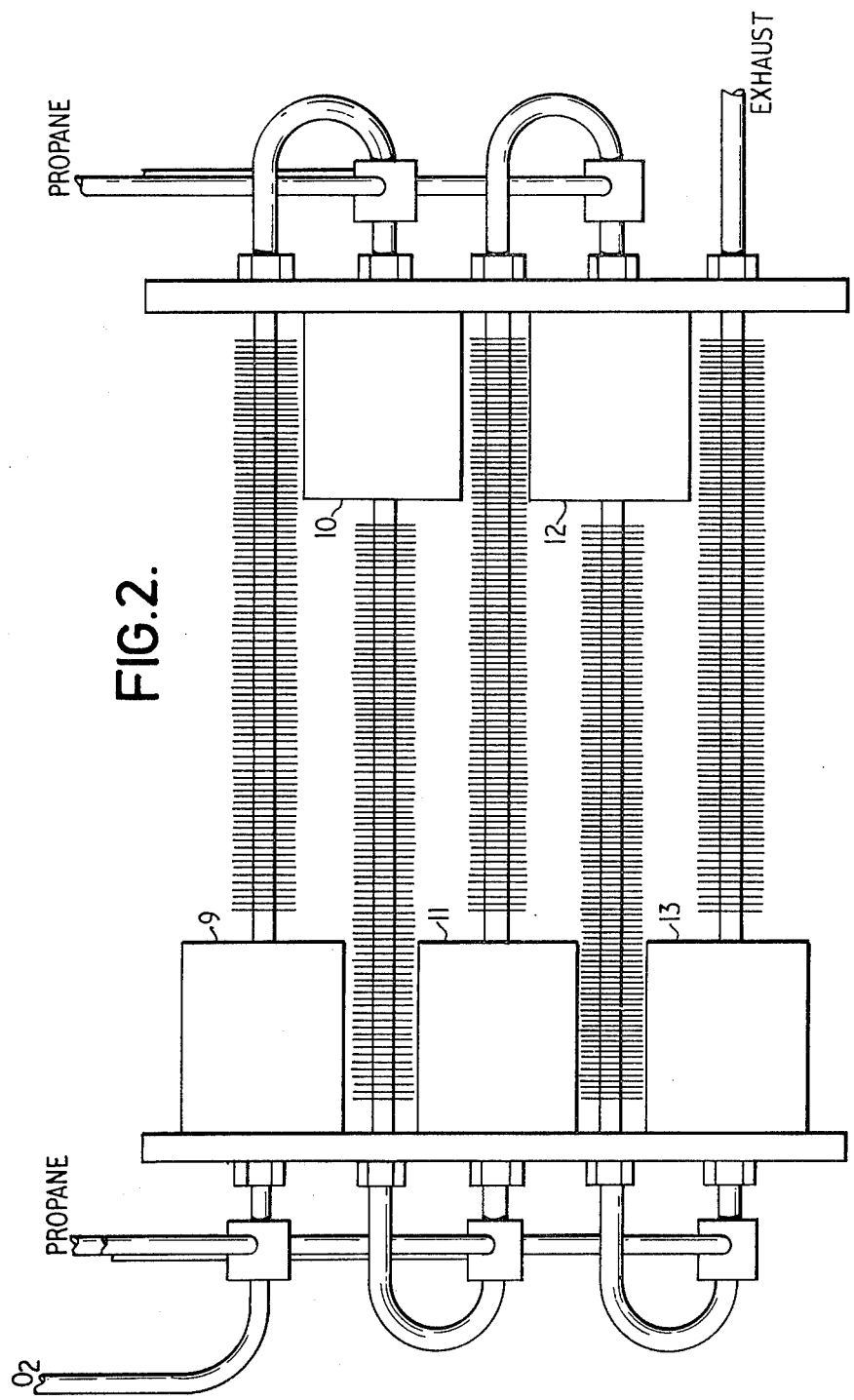

POWER SOURCES

This invention relates to power sources which may be used underwater and to such sources in which catalytic combustion of the fuel takes place.

There are numerous applications where conventional power sources using flame combustion are not practical due to the operating and environmental conditions. An example is when a power source is to be used underwater. In such a case the fuel and air are under pressure and flame combustion is difficult to maintain at the high pressures prevailing at the depths at which the power source is required to operate.

At present, one difficulty confronting designers of catalytic combustion units is the high temperature produced when all the fuel is burnt in the presence of excess oxygen because existing supports and catalysts are unable to withstand temperatures over 1000° C.

An object of the present invention is to produce a compact power source, which may be used underwater, in which the fuel undergoes catalytic combustion thereby heating a water boiler of a device such as a steam turbine.

According to one aspect of the present invention a power source which may be used for providing power underwater, includes two or more catalytic combustors each comprising a fuel injector, a supported catalyst having a ceramic or metallic support, a high surface area refractory metal oxide coating on the support and a catalytic layer on the coating the catalytic layer comprising a platinum group metal selected from the group consisting of Ru, Rh, Pd, Ir, Pt alloys of the said metals with each other and alloys of one or more of the said metals with one or more base metals such that at least 10% by weight of the said catalyst is a platinum group metal each combustor having a separate fuel supply and a separate heat exchange unit which form part of the same boiler. The boiler may be a steam boiler and the steam may be used to drive a prime mover, for example, a steam turbine. If desired, the heat exchange units may constitute parts of the same heat exchanger.

According to a second aspect of the present invention the catalytic combustors and the heat exchange units are in close proximity to each other in a zig zag arrangement within the confines of the boiler, said boiler being used to drive a steam turbine or similar device.

Preferably the washcoat is a high surface area refractory metal oxide such as beryllia, magnesia or silica or combinations of metal oxides such as boria-aluminia or silica-alumina.

Preferably the metallic support is in the form of a monolith formed from one or more metals selected from the group comprising Ru, Rh, Pd, Ir and Pt. If desired, the metallic monolith can be made from base metals or base metal alloys which contain a platinum group metal. Conveniently, the monolith is in the form of a honeycomb.

The walls of the metallic monolith preferably have a thickness of 2 to 4 thousandths of one inch. The preferred characteristics of the metallic monolith having catalyst deposited thereon are (i) that it presents low resistance to the passage of gases by virtue of its possession of a high ratio of open area to blocked area and (ii) that it has a high surface to volume ratio.

Suitable platinum group metals for use in fabrication of the metallic monolith are platinum, 10% rhodium-platinum and dispersion strengthened platinum group metals and alloys as described in British Patent Specification Nos. 1,280,815 and 1,340,076 and U.S. Pat. Nos. 3,689,987, 3,696,502 and 3,709,667.

Suitable base metals which may be used are those capable of withstanding rigorous oxidising conditions. Examples of such base metal alloys are nickel and chromium alloys having an aggregate Ni plus Cr content greater than 20% by weight and alloys of iron including at least one of the elements chromium (3–40) wt.%, aluminium (1–10) wt.%, cobalt (0–5) wt.%, nickel (0–72) wt.% and carbon (0–0.5) wt.%. Such substrates are described in German OLS No. 2,450,664.

Other examples of base metal alloys capable of withstanding the rigorous conditions are iron-alumina-chromium alloys which may also contain yttrium. The latter alloys may contain 0.5–12 wt.% Al, 0.1–3.0 wt.% Y, 0–20 wt.% Cr and balance Fe. These are described in U.S. Pat. No. 3,298,826. Another range of Fe-Cr-Al-Y alloys contain 0.5–4 wt.% Al, 0.5–3.0 wt.% Y, 20.0–95.0 wt.% Cr and balance Fe and these are described in U.S. Pat. No. 3,027,252.

Base metal alloys which also contain a platinum group metal component are useful as a catalytic metallic monolith in very fierce oxidising conditions, for example in catalysis of the combustion in gas turbine engines. Such alloys are described in German DOS No. 2,530,245 and contain at least 40 wt.% Ni or at least 40 wt.% Co, a trace to 30 wt.% Cr and a trace to 15 wt.% of one or more of the metals Pt, Pd, Rh, Ir, Os and Ru. The alloys may also contain from a trace to the percentage specified of any one or more of the following elements:

|  | % by weight |
| --- | --- |
| Co | 25 |
| Ti | 6 |
| Al | 7 |
| W | 20 |
| Mo | 20 |
| Hf | 2 |
| Mn | 2 |
| Si | 1.5 |
| V | 2.0 |
| Nb | 5 |
| B | 0.15 |
| C | 0.05 |
| Ta | 10 |
| Zr | 3 |
| Fe | 20 |
| Th and rare earth metals or oxides | 3 |

Where the metallic substrate is composed either substantially or solely of platinum group metal it may be in the form of an interwoven wire gauze or mesh or corrugated sheet or foil. Where the metallic substrate is composed substantially of base metal it is preferably in the form of corrugated sheet or foil. These types of base metal monoliths are also described in German OLS No. 2,450,664 and they may be used in catalytic combustors according to the present invention. Such base metal monoliths may have deposited thereon a first layer comprising an oxygen containing coating and a second and catalytic layer. The oxygen containing coating is usually present as an oxide selected from the group consisting of alumina, silica, titania, zirconia, hafnia, thoria, beryllia, magnesia, calcium oxide, strontium oxide, barium oxide, chromia, boria, scandium oxide, yttrium oxide and oxides of the lanthanides. Alternatively, the oxygen in the first layer is present as an oxygen containing anion selected from the group consisting of chromate, phosphate, silicate and nitrate. The second catalytic layer may, for example, comprise a metal selected from the group consisting of Ru, Rh, Pd, Ir, Pt, Au, Ag, an alloy containing at least one of the said metals and alloys containing at least one of the said metals and a base metal. The first and second layers may be deposited or otherwise applied to the monolith as described in German OLS No. 2,450,664.

Alternative catalytic monoliths are the structures defined in British Patent Application No. 51219/76 dated Dec. 8, 1976.

In British Patent Application No. 51219/76 there is described a catalyst comprising a metallic substrate having deposited thereon a surface coating consisting of one or more intermetallic compounds of the general formula $A_xB_y$ where A is selected from the group consisting of Al, Sc, Y, the lanthanides, Ti, Zr, Hf, V, Nb and Ta and x and y are integral and may have values of 1 or more.

In British Patent Application No. 51219/76 the surface coating of intermetallic compound is, preferably, in the form of a thin film ranging in thickness from 2 to 15 microns.

Many compounds of the type $A_xB_y$ are miscible with one another and structures in which the surface coatings deposited upon the said metallic substrate contains more than one compound of the type $A_xB_y$ are included within the scope of this invention.

When the intermetallic compound is deposited in the form of a coating not more than 15 microns thick upon the surface of a metallic substrate, excessive brittleness is absent and the coated substrate may be handled normally.

A number of different techniques may be employed to produce a coating in the form of a thin film of intermetallic compound upon the surface of the metal metallic monolith. For example, aluminium may be deposited onto the surface of rhodium-platinum gauze by a "pack-aluminising" process. In this process the gauzes are packed into a heat-resistant container in an appropriate mixture of chemicals such that aluminium is transferred via the vapour phase to the gauze surface. At the aluminising temperature, typically 800°–900° C., interaction between the platinum and aluminium occurs to give the required intermetallic compound.

Alternatively, chemical vapour deposition from $ZrCl_4$ can be used to form a layer of $Pt_3Zr$, or electrodeposition may be used either from aqueous or fused salt electrolysis to give the requisite compound.

Whichever method is adopted the object is to form a layer of a firmly adherent, intermetallic compound on the wires of the gauze pack or other substrate.

In another technique, the metals forming the intermetallic compound are prepared as an appropriate solution in water or an organic solvent. The compound is caused to deposit upon the metallic substrate or gauze by the addition of a reducing agent.

The metallic substrate is placed in the solution whilst the precipitation is taking place and becomes coated with a uniform, microcrystalline layer of the intermetallic compound.

The fuel may be liquid or gaseous depending on what is suitable and convenient to use. Where the fuel is gaseous we prefer propane.

During operation of the power source according to the invention, there is a through-put of oxygen or oxygen-containing gas such as air, through the system of catalytic combustors and heat exchangers. The fuel is added by instalments with a proportion of the fuel being injected into the gaseous stream before each catalytic combustor. The fuel and the oxygen or oxygen containing atmosphere should be passed into the system under pressure, between 15 psi to 500 psi, so that pressure within the system is above the external fresh or sea water pressure.

To start the power source hydrogen is passed through as the fuel. Once combustion has been initiated the hydrogen is gradually replaced by the fuel so that working temperature of the catalyst is reached.

The invention will now be described with reference to the accompanying drawings in which FIG. 1 is a diagram showing an under sea power system according to the invention and including a steam turbine, and FIG. 2 is a diagram showing details of a water boiler according to the invention.

In the embodiment of FIG. 1 the fuel used is propane injected via valve Sv into a stream of oxygen prior to each catalytic combustor designated CAT. The ratio of oxygen to total propane added is approximately 5:1 by volume, the oxygen is introduced into the system under pressure. A proportion of the fuel is added before the first (considered left to right) catalytic combustor where combustion takes place. The hot stream of gases is then successively passed through heat exchange units H/X. The gases are finally passed through another heat exchange unit HX which is contained in the same water boiler as the first and second heat exchange unit H/X. The number of stages in which a proportion of the fuel is added to the stream of gases which pass through a catalytic combustor and a heat exchange unit must be at least two. The temperature of the catalyst should be between 4° C. and 850° C.

Steam from the water boiler is drawn off to drive the steam turbine, or any similar device. The outlet from the steam turbine is cooled, before being returned to the water boiler, by a sea-water condenser if the power source is being used underwater. The temperature of the water on leaving the condenser will be in the region of 4° C. By utilizing the heat present in the exhaust gases and the steam before it enters the condenser the temperature of the returning water will be between 4° C. and 80° C.

The arrangement of the catalytic combustors and the heat exchange units is such that the water boiler stage is one compact unit. In another embodiment twelve catalytic combustors and associated heat exchange units are connected in a back to back arrangement as illustrated in FIG. 2. Parts 9, 10, 11, 12 and 13 are the catalytic combustors. The cooling fins attached to the pipes connecting the catalytic combustors act as heat exchangers. Parts 9 and 13 are two of the six catalytic combustors and heat exchange units in the outer ring with four in the middle ring aligned in the opposite direction with one catalytic combustor and heat exchange unit in the middle lying in the same direction as the outer six units.

The temperature of the water in the water boiler will be from 4° C. upwards. The upper limit is the critical temperature of the water at about 374.1° C. although superheated water may be present at higher temperatures. The water temperature will be dependent on the steam turbine pressure.

The number of stages in which combustion of the fuel takes place is dependent on a number of variables such as the fuel, the temperature of the water, the catalyst used and the atmosphere. When an atmosphere of air is used fewer catalytic combustors are required than if pure oxygen was used. The efficiency of the power source can be improved by preheating the incoming fuel by utilizing the heat of the exhaust gases or a small heat exchange unit.

I claim:

1. A power source for providing power underwater, including two or more catalytic combustors each comprising a fuel injector, a supported catalyst having a ceramic or metallic support, a high surface area refractory metal oxide coating on the support and a catalytic layer on the coating, the catalytic layer comprising a platinum group metal selected from the group consisting of Ru, Rh, Pd, Ir, Pt, alloys of the said metals with each other and alloys of one or more of the said metals with one or more base metals such that at least 10% by weight of the said catalyst is a platinum group metal, each combustor having a separate fuel supply and a separate heat exchange unit, the combustors being connected together in series such that the output from one combustor is passed through its heat exchange unit and then into the next combustor, the heat exchange units forming part of the same boiler.

2. A power source according to claim 1 wherein the heat exchange units constitute parts of the same heat exchanger.

3. A power source according to claim 1 wherein the catalytic combustors and the heat exchange units are in close proximity to each other in a zig zag arrangement within the confines of the boiler, said boiler being used to drive a steam turbine or similar device.

4. A power source according to claim 1 wherein the high surface refractory metal oxide coating is bergillia, magnesia, or silica or combinations of metals oxides selected from boria-alumina and silica-alumina.

5. A power source according to claim 1 wherein the metallic support is in the form of a monolith formed from one or more metals selected from the group comprising Ru, Rh, Pd, Ir and Pt.

6. A power source according to claim 1 wherein the metallic monolith is made from a base metal, a base metal alloy or a base metal alloy containing a platinum group metal.

7. A power source according to claim 5 wherein the metallic monolith is made from a 10% rhodium-platinum alloy.

8. A power source according to claim 6 wherein the base metal alloy is an alloy selected from the group consisting of nickel and chromium alloys having an aggregate nickel plus chromium content greater than 20 art %, alloys of iron including at least one of the elements chromium (3–40) wt.%., aluminium (1–10) wt.%, cobalt (0–5) wt.%, nickel (0–72) wt.% and carbon (0–0.5) wt.%, an alloy containing 0.5–12 wt.% Al, 0.1–3.0 wt.% Y, 0–20 wt.% Cr and balance Fe, an alloy containing 0.5–4 wt.% Al, 0.5–3.0 wt.% Y, 20.0–95.0 wt.% Cr and balance Fe, and an alloy containing at least 40 wt.% Ni or at least 40 wt.% Co, a trace to 30 wt.% Cr and a trace to 15 wt.% of one or more of the metals Pt, Pd, Rh, Ir, Os and Ru.

* * * * *